US005626170A

United States Patent [19]

Parker

[11] Patent Number: 5,626,170
[45] Date of Patent: *May 6, 1997

[54] AUTOMATIC TRANSMISSION FLUID CHANGER APPARATUS

[75] Inventor: Zachary T. Parker, Huntington Beach, Calif.

[73] Assignee: Flo-Dynamics, Inc., Compton, Calif.

[*] Notice: The term of this patent shall not extend beyond the expiration date of Pat. No. 5,370,160.

[21] Appl. No.: 348,614

[22] Filed: Dec. 2, 1994

Related U.S. Application Data

[63] Continuation-in-part of Ser. No. 145,686, Oct. 29, 1993, Pat. No. 5,370,160, which is a continuation-in-part of Ser. No. 11,992, Feb. 1, 1993, abandoned.

[51] Int. Cl.$^6$ ................... B65B 1/04; B65B 3/04; B67C 3/02
[52] U.S. Cl. ................... 141/98; 141/4; 141/65; 141/367; 417/307; 134/169 C; 134/166 R
[58] Field of Search ................... 141/4, 5, 7, 59, 141/65, 98, 378, 367, 46; 134/169 C, 166 R; 222/573; 184/1.5, 106; 417/307

[56] References Cited

U.S. PATENT DOCUMENTS

| | | | |
|---|---|---|---|
| 1,655,939 | 1/1928 | Copeland | 184/1.5 |
| 1,829,173 | 10/1931 | Wertz | 184/1.5 |
| 1,884,820 | 10/1932 | Osborne | 184/1.5 |
| 2,320,048 | 5/1943 | Parson | 184/1.5 |
| 2,499,705 | 3/1950 | Vokes | 184/1.5 |
| 3,216,527 | 11/1965 | Lewis | 184/1.5 |
| 3,447,636 | 6/1969 | Bonfilio | 184/1.5 |
| 3,513,941 | 5/1970 | Becnel | 184/1.5 |
| 3,720,287 | 3/1973 | Martel | 184/1.5 |
| 3,867,999 | 2/1975 | Cox | 184/1.5 |
| 4,095,672 | 6/1978 | Senese | 184/1.5 |
| 4,095,673 | 6/1978 | Takeuchi | 184/1.5 |
| 4,114,644 | 9/1978 | Piper | 137/565 |
| 4,128,140 | 12/1978 | Riches | 184/1.5 |
| 4,331,185 | 5/1982 | Rinaldo et al. | 141/95 |
| 4,435,127 | 3/1984 | Kränzle et al. | 417/26 |
| 4,674,456 | 6/1987 | Merritt | 123/196 S |
| 4,745,989 | 5/1988 | DiMatteo | 184/1.5 |
| 4,807,674 | 2/1989 | Sweet | 141/59 |
| 4,869,346 | 9/1989 | Nelson | 184/1.5 |
| 4,938,315 | 7/1990 | Ohta et al. | 184/1.5 |
| 4,951,784 | 8/1990 | Bedi | 123/196 R |
| 4,958,666 | 9/1990 | Kocourek et al. | 141/114 |

(List continued on next page.)

FOREIGN PATENT DOCUMENTS

2-72299  3/1990  Japan.

OTHER PUBLICATIONS

Ex F:appears to be documents intended to promote Orbis ATF Changer and what purports to be English translation of some of the documents.
Ex. G:appears to be document relating to Tatsuno ATF Changer.
Ex. H:appears to be documents from Yamada Corporation relating to various apparatus and what purports to be English translation of some of the documents.
Ex. I:appears to be brochure from Engine Solutions.
Ex. J:appears to consist of purported brochure for an Automatic Transmission Changer from Lih Yann Corporation, printed in Chinese, as well as various other documents printed in foreign languages, and what purports to be English translation thereof.
Ex K:appears to be set of instructions purportedly utilized by employees of Grease Monkey of Denver, Colorado.

*Primary Examiner*—Henry J. Recla
*Assistant Examiner*—Timothy L. Maust
*Attorney, Agent, or Firm*—Fulwider Patton Lee & Utecht

[57] ABSTRACT

An automatic transmission fluid exchanging device includes drain and supply tubes to conduct used transmission fluid from and unused transmission fluid to a vehicle transmission. The device further includes a supply pump in the supply tube to flow unused transmission fluid into the transmission. A pair of flow control valves are disposed in the respective drain and supply tubes to allow the operator to match the flow rates of fluid through the respective tubes.

27 Claims, 6 Drawing Sheets

U.S. PATENT DOCUMENTS

| | | | |
|---|---|---|---|
| 5,056,621 | 10/1991 | Trevino | 184/1.5 |
| 5,062,398 | 11/1991 | Bedi et al. | 184/1.5 |
| 5,062,500 | 11/1991 | Miller et al. | 184/106 |
| 5,090,458 | 2/1992 | Creeron | 141/7 |
| 5,092,429 | 3/1992 | Linares et al. | 184/1.5 |
| 5,148,785 | 9/1992 | Sendak | 184/1.5 |
| 5,291,968 | 3/1994 | Brown | 184/1.5 |
| 5,318,070 | 6/1994 | Dixon et al. | 210/167 |
| 5,318,080 | 6/1994 | Viken | 141/98 |
| 5,337,708 | 8/1994 | Chen | 123/198 A |
| 5,370,160 | 12/1994 | Parker | 141/98 |
| 5,372,219 | 12/1994 | Peralta | 184/1.5 |
| 5,390,762 | 2/1995 | Nelson | 184/1.5 |
| 5,427,202 | 6/1995 | Behring et al. | 184/1.5 |
| 5,447,184 | 9/1995 | Betancourt | 141/98 |

AUTOMATIC TRANSMISSION FLUID CHANGER APPARATUS

This application is a continuation-in-part of application Ser. No. 08/145,686 filed Oct. 29, 1993 and now U.S. Pat. No. 5,370,160, which was a continuation-in-part of application Ser. No. 011,992, filed Feb. 1, 1993, now abandoned.

BACKGROUND OF THE INVENTION

1. Field of the Invention

The subject invention relates to vehicle maintenance and, more particularly, to an apparatus for withdrawing and replenishing transmission fluid in an automatic transmission.

2. Description of the Prior Art

Automatic transmissions require transmission fluid because such fluid is employed in part as a driving means within the transmission and is additionally employed to lubricate the internal components within such transmissions. Over time such fluid becomes less viscous and thus less efficient in lubricating such components. It is therefore desirable to periodically perform an exchange of fluid to maintain the viscosity of such fluid within the transmission and to maintain the cleanliness of the transmission and thereby increase the useful life of the transmission. A complete exchange of fluid is preferred so that the used fluid as well as undesirable foreign matter contained therein is completely removed and is replaced with new, more viscous fluid.

In the field of devices for flushing and filling fluids in an automobile engine or transmission, various different embodiments of such apparatus have been known for a number of years and, by way of example, forms of such embodiments can be found in U.S. Pat. Nos. 3,513,941, 3,867,999 4,095,673, 4,674,456, and 5,056,621.

The above mentioned prior art flushing and filling apparatus have some disadvantageous features associated with them. For example, flushing and filling automatic transmissions with fluid or oil according to many prior art methods is a relatively time-consuming, cumbersome and inefficient process. The conventional method is to replace the fluid housed in the pan of the transmission. The pan typically holds from 1 to 5 quarts of the total 7 to 15 quart capacity of the transmission. Thus emptying the pan and then adding that amount of new fluid only serves to dilute the used fluid with some 15-25% of new fluid. Hence this conventional service is inefficient since it only serves to mix new fluid with a large quantity of used fluid. Furthermore, this service requires the removal of the transmission fluid pan from the transmission for emptying of the fluid therefrom and replacement of the pan on the transmission housing. This is a messy and time consuming process. Furthermore, the pan is often not replaced squarely over the pan seal or, on occasion, will trap small foreign obstacles in the seal area resulting in leakage.

More recently, there have been efforts to change all the fluid in an automobile's transmission by disconnecting a fluid tube and draining the fluid into a waste oil dump while manually pouring new fluid into the transmission dipstick hole. This procedure has proven to be inefficient, inadequate and so time consuming that it has failed to gain broad popularity.

Another prior method involved disconnecting a transmission fluid cooler line and allowing one end of such cooler line carrying used fluid to drain freely, while the other end of the line was connected to a pressurized tank which injected unused fluid into the cooler line connected to the transmission. One major disadvantage associated with this method is that, in many instances, the rate at which fluid exits the transmission cannot be matched by the rate at which unused fluid is injected into the transmission because the transmission, due to internal resistances, cannot accept fluid at the same rate as the rate at which used fluid is flowed by the transmission pump into an unrestricted cooler line. As such, there is a risk that the fluid seals, rear bearings and other internal components of the transmission could suffer damage due to the progressively diminishing level of fluid in the transmission during such a process. This difficulty is compounded by the fact that the flow resistance varies with the different models of transmissions.

Other work in this field has led to the proposal of a transmission changer including air pressurized tanks for supply and extraction of transmission fluid via the transmission cooling lines. A device of this type is shown in U.S. Pat. No. 5,318,080 to Viken issued on an application filed Oct. 25, 1991, subsequent to the time I conceived my invention. I am unaware of any commercialization of this device.

As such, it may be appreciated that there continues to be a need for an automatic transmission fluid exchanging device which efficiently removes substantially all of the used fluid in an automatic transmission and simultaneously replaces the removed fluid with the same amount of unused transmission fluid, while at the same time posing minimum risk of damage to the transmission. The instant invention addresses such needs.

SUMMARY OF THE INVENTION

Briefly and in general terms, the present invention provides an automatic transmission fluid removal and replacement device that includes drain and supply tubes to releasably connect to, respectively, a disconnected cooler line that normally conducts used transmission fluid to the radiator of the vehicle, and to a port on the radiator to which the cooler line is normally connected. The tubes are connected at their other ends to, respectively, drain and supply tanks. The apparatus further includes a supply pump device for supplying transmission fluid at a controlled rate to the transmission. The transmission fluid pump is employed to flow used fluid through the disconnected cooler line and into the drain tank, while the supply pump simultaneously injects unused fluid through the supply tube and into the cooler port of the radiator. A flow control device is provided to control the rate of flow in the supply tube so the volume of unused fluid does not exceed the volume of used fluid flowed from the transmission so the desired fluid level may be maintained in the transmission throughout the exchange process.

Other features and advantages of the invention will become apparent from the following detailed description, taken in conjunction with the accompanying drawings which illustrate, by way of example, the features of the invention.

DETAILED DESCRIPTION OF THE PREFERRED EMBODIMENTS

Figure 1:
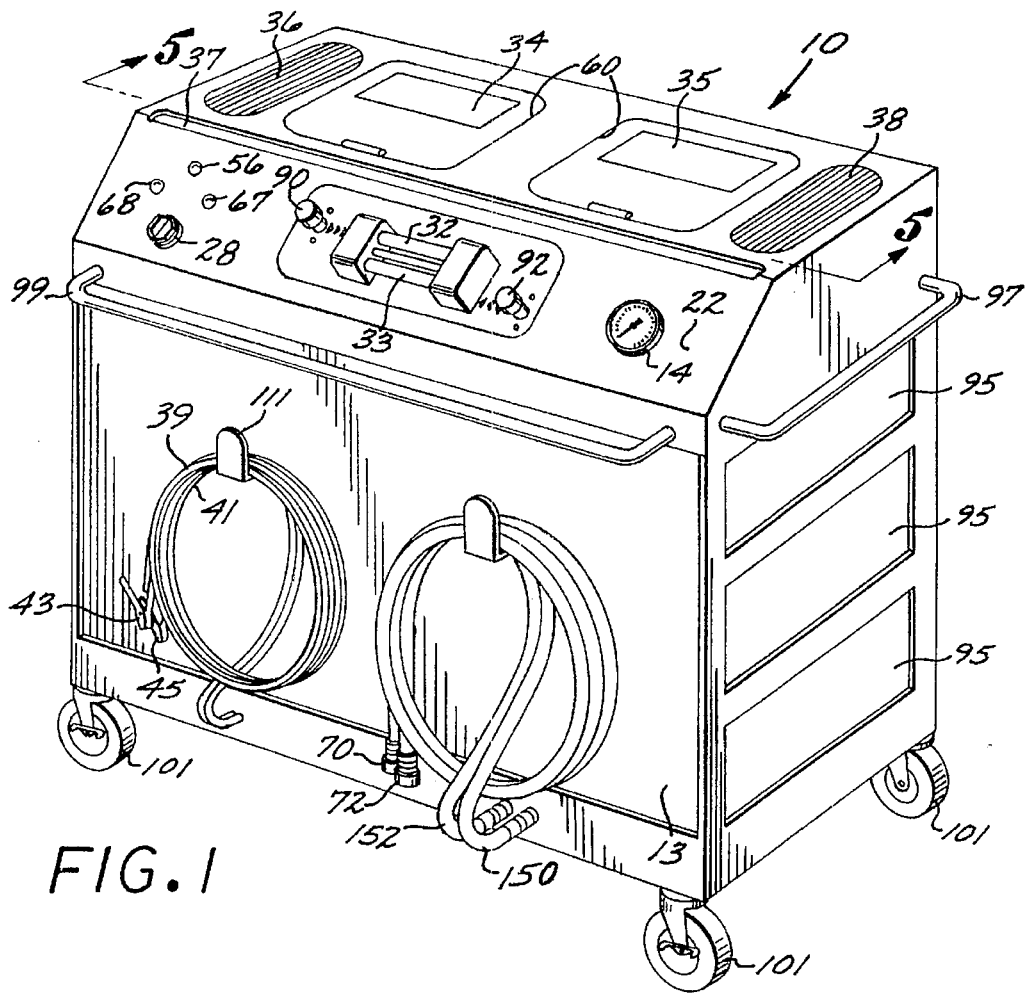
FIG. 1 is a perspective view of a transmission fluid changer apparatus embodying the present invention.
Figure 2:
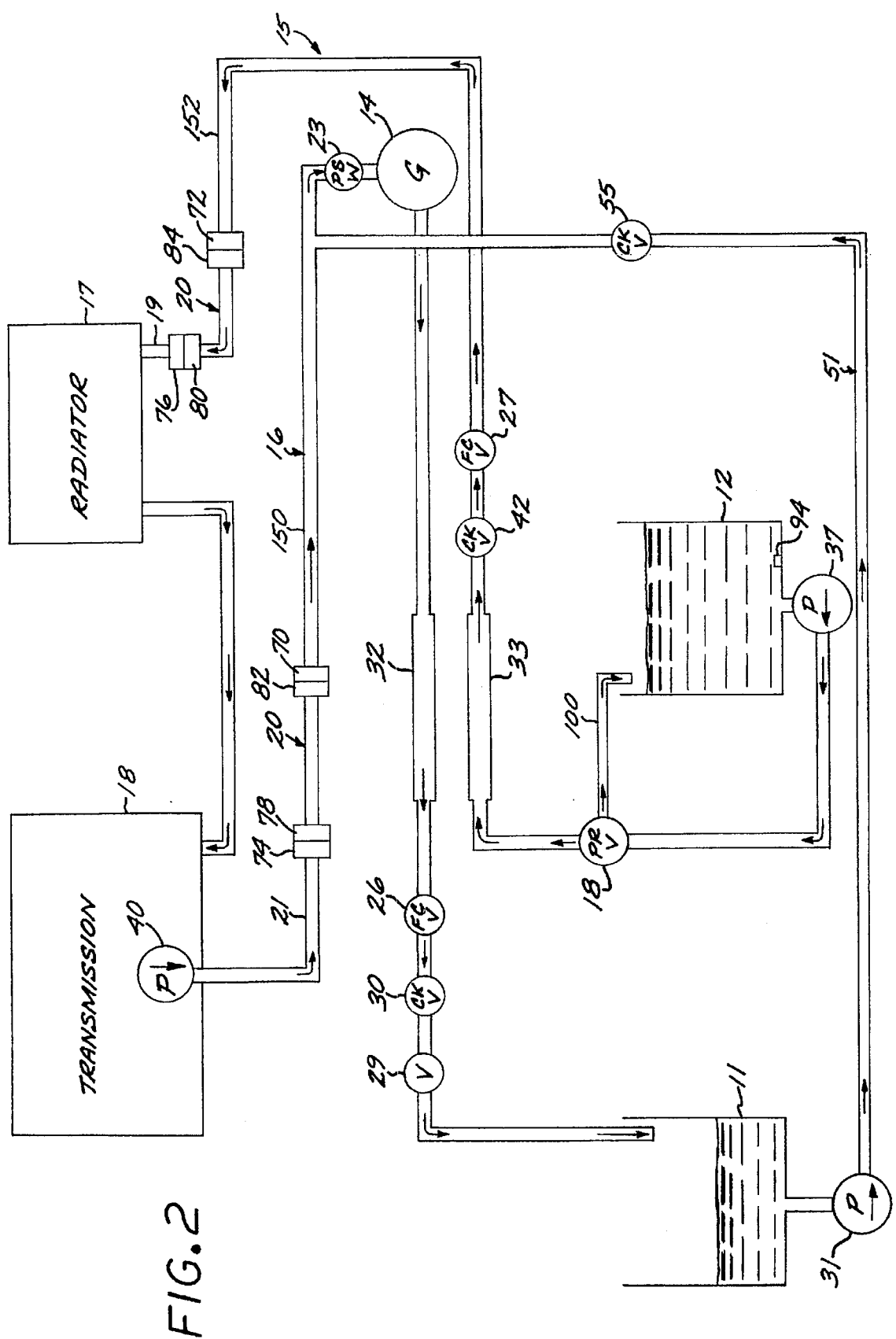
FIG. 2 is a schematic diagram of the transmission fluid changer apparatus shown in FIG. 1.

In the following description, like reference numerals will be used to refer to like or corresponding elements in the different figures of the drawings. Referring now to the drawings, and particularly to FIGS. 1 and 2, the automatic transmission changer apparatus of my present invention, generally designated 10, includes, generally, a fluid circuit formed by supply plumbing 15 and drain plumbing 16. The fluid circuit is housed in a cabinet, generally designated 13, and includes respective drain and supply tanks 11 and 12 (FIG. 2). A 12-volt electric supply pump 37 is included in the supply plumbing. The respective supply and drain plumbing systems 15 and 16 include respective interior tubes with respective flow control valves 26 and 27 and respective exterior, elongated flexible supply and drain hoses 150 and 152 having respective connectors 70 and 72 at the free ends. The drain hose 150 may be releasably coupled to the transmission fluid circuit downstream of the transmission fluid pump 40 to thereby create a path through the drain plumbing for used transmission fluid to flow from the transmission fluid pump and into the drain tank 11. The free end of the supply hose 152 may be releasably coupled to the transmission fluid circuit upstream of the transmission pump 40 in the transmission 18 to thereby create a flow path through the supply plumbing for unused transmission fluid to flow from the supply tank 12 to the transmission so that a complete, simultaneous exchange of the fluid in the automatic transmission may be performed.

Figure 3:
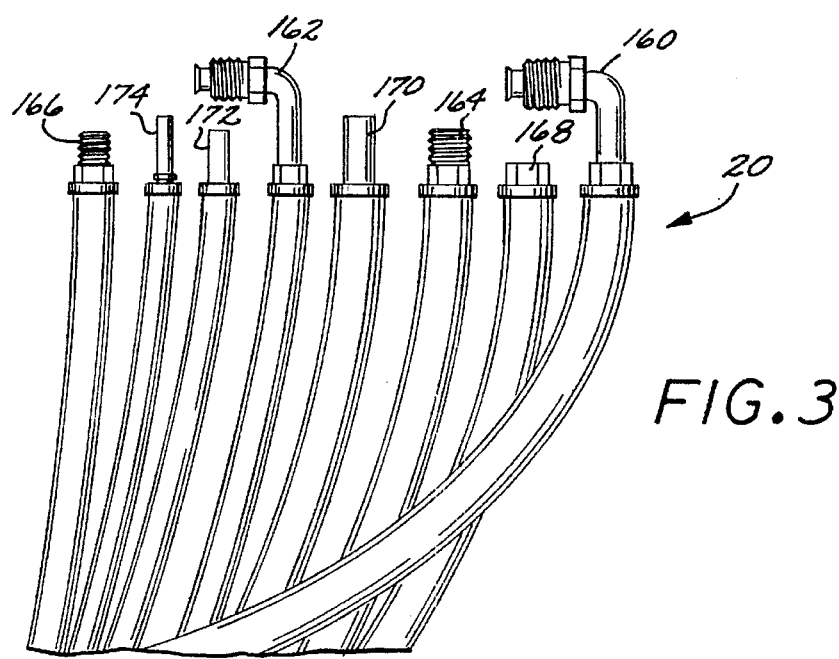
FIG. 3 is a partial top plan view, in enlarged scale, of adaptor tubes included in the transmission fluid changer apparatus shown in FIG. 1.

Referring to FIG. 2, the drain and supply hoses are in the form of open ended flexible hoses and include at the distal ends thereof the respective quick disconnect couplers 70 and 72 to releasably couple, respectively, to the ends of a segment of a disconnected cooler line 21 and a port 19 on the radiator from which the cooler line has been disconnected (FIG. 2). However, because automobile manufacturers design their respective automobiles differently, the factory cooler lines 21 and radiator ports 19 for various automobiles will be formed differently and thus have differently configured couplings, generally designated 74 and 76 (FIG. 2). Therefore, I provide a set of adaptor tubes, generally designated 20 (FIG. 3). The set 20 of adaptor tubes shown by way of example, while not exhaustive, incorporate on the different tubes, for instance an elbow end fitting 160 of one thread size, an elbow end fitting 162 of another thread size, respective straight male fittings 164 and 166 (FIG. 3) of different thread size, a female fitting 168 and male compression tube fittings 170, 172 and 174. For demonstrative purposes, I have shown schematically in FIG. 2, one of the adaptor tubes of the set 20 for connection with the respective fitting couplers 74 and 76, one with the end fitting shown symbolically as 78 and the other with the fitting shown symbolically at 80. As schematically shown in FIG. 2, the disconnected cooler line 21 is disconnected leaving a fitting 74 which is normally engaged with the coupling 76 of the radiator port. Thus, one adaptor tube with an end coupling 78 configured for engaging the coupling 74 is releasably engaged at one end to such coupling and has an opposite end formed with a coupling 82 configured to engage the coupling 70 of the drain tube to thereby create a fluid path from the transmission pump 40 to the drain tank 11. Likewise, an adaptor tube is selected with an end coupling 80 at one end thereof configured to engage the end fitting defining the coupling 76 of the radiator port 19 and is releasably engaged at such end to such coupling and is configured at its opposite end 84 to engage the end coupling 72 of the supply tube to create a fluid path from the supply tube to the radiator port (FIG. 2).

Figure 5:
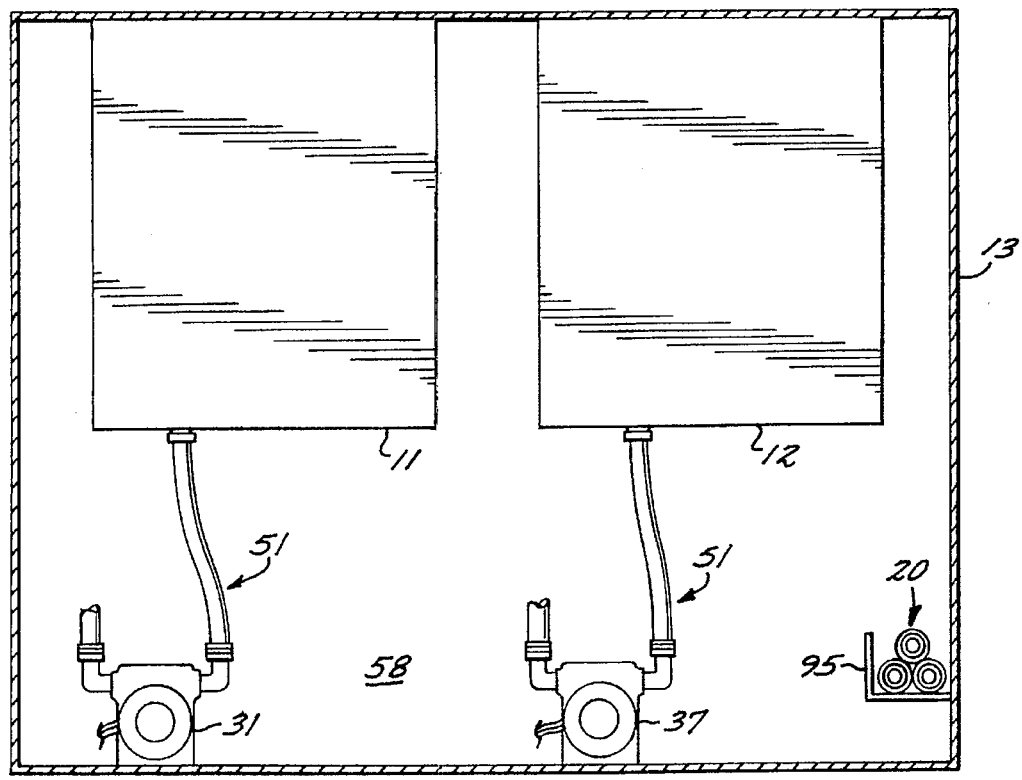
FIG. 5 is a vertical sectional view, in enlarged scale, taken along the line 5—5 of FIG. 1.

In the preferred embodiment, the drain and supply tanks 11 and 12 comprise generally cubical, upwardly opening translucent fluid holding reservoirs (FIG. 5). In selected applications, one or both of such tanks may be in the form of stationary bulk tanks to which hoses may be selectively communicated. Formed on one of the vertical side walls of the respective tanks 11 and 12 are a plurality of horizontal indicia at spaced elevations along respective vertical windows to define respective fluid level gauges to indicate the quantity of fluid stored in either tank. As such, the operator may visually determine when a certain amount of fluid has been withdrawn from or injected into the transmission by observing the level of fluid stored in the respective tank.

Figure 4:
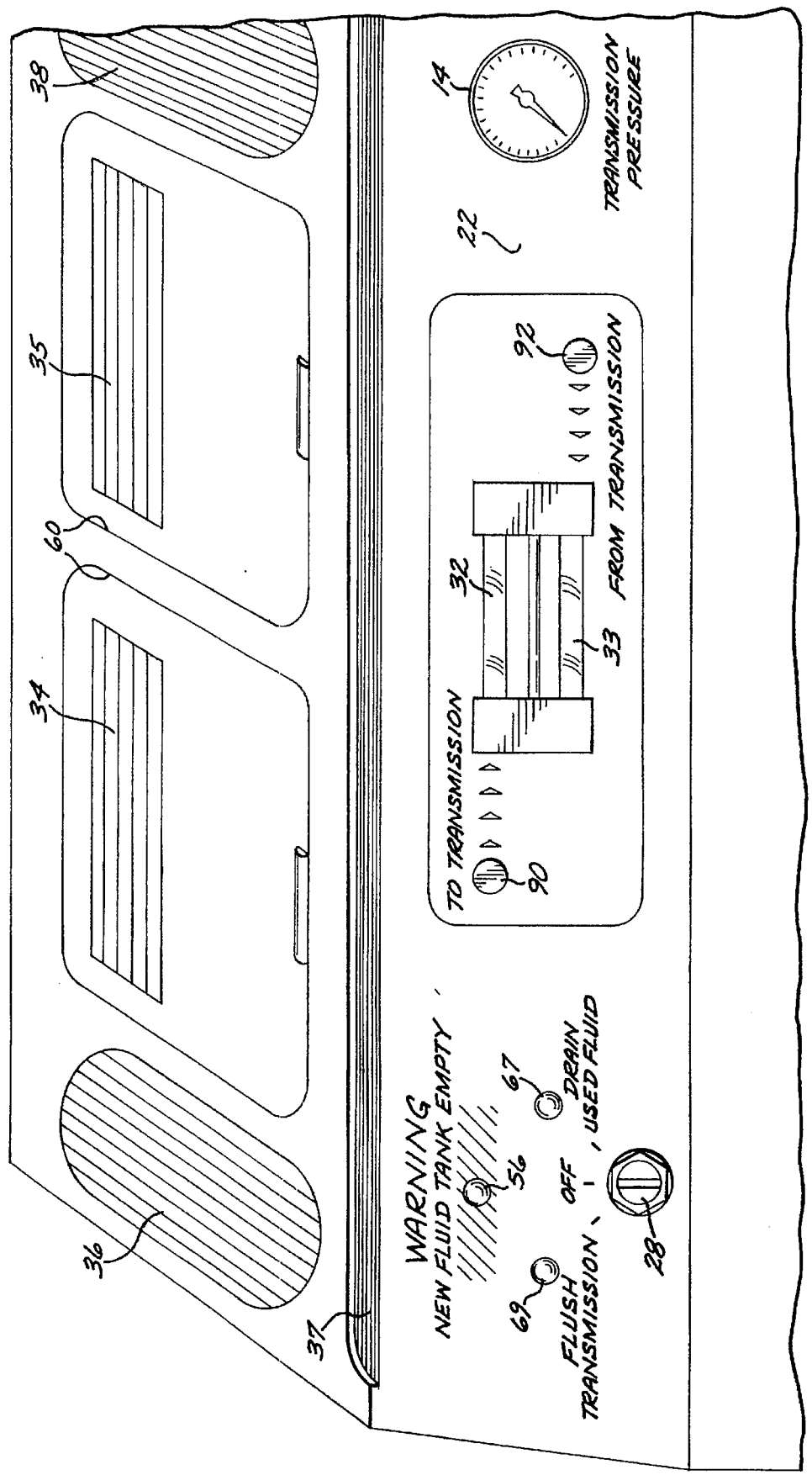
FIG. 4 is a fragmentary perspective view, in enlarged scale, of the transmission fluid changer apparatus shown in FIG. 1.

The flow control valves 26 and 27 (FIG. 2) are in the form of manually adjustable needle valves having respective control knobs 90 and 92 projecting from the cabinet 13 (FIG. 4). As such the respective flow control valves may be manually adjusted to either increase or decrease the rate at which used fluid is withdrawn from or injected into the transmission thereby providing for the precise matching of flow rates of the used fluid from and unused fluid to the transmission regardless of the internal flow resistances within a particular automatic transmission.

As illustrated in FIG. 2, the drain plumbing 16 further includes, in series, a pressure switch 23, a pressure gauge 14, an on-off solenoid valve 29, a drain check valve 30, and a drain sight glass 32.

The pressure switch 23 is operative upon detecting a predetermined suitable pressure level in the drain tube to open the normally closed on-off valve 29 and to actuate the supply pump to initiate flow of used fluid through the drain tube as described hereinafter in more detail.

The pressure gauge 14 senses fluid pressure in the drain tube as generated by the transmission fluid pump 40. The operator may compare the pressure gauge reading (in psi) with the normal operating range of the transmission fluid pump from an owner's manual or the like to obtain an indication of the condition of the transmission itself.

The on-off drain solenoid valve 29 is operative to either open or close the fluid flow path from the transmission through the drain tube to the drain tank 11. When the on-off valve is closed, fluid is blocked from flowing through the drain tube so the transmission will not be at risk of being drained to a low level before replacement fluid is introduced. The pressure switch, upon sensing a suitable fluid pressure in the drain tube, generates an electrical signal communicated to the on-off valve. The valve may then be opened by the operator turning a selector switch 28 (FIG. 1) to the "FLUSH TRANSMISSION" position as hereinafter described in more detail.

The drain sight glass 32 is in the form of a hollow open ended transparent glass tube mounted on the control panel 22 of the cabinet 13 and is connected in line with the drain plumbing system 16 (FIGS. 2 and 7) thereby allowing the operator to visually observe the color of the fluid being withdrawn from the transmission so that it may be determined when the fluid being drained attains the same color as clean transmission fluid thus providing an indication that there has been a full fluid exchange. In this regard, it will be appreciated that initially, the fluid flowing through the drain sight glass as the exchange is commenced will typically have a brown tint as is characteristic of used fluid. When the used fluid has been substantially fully removed from the transmission, the color of the fluid flowing through the drain sight glass will attain a red tint as is characteristic of many types of unused transmission fluid.

The one way check valve 30 is connected in line with the drain plumbing 16 (FIGS. 2 and 7) and acts to permit fluid flow in only one direction through the drain plumbing, from the transmission to the drain tank. Thus, used fluid removed from the transmission may not be reinjected into the transmission through the drain plumbing.

Figure 7:
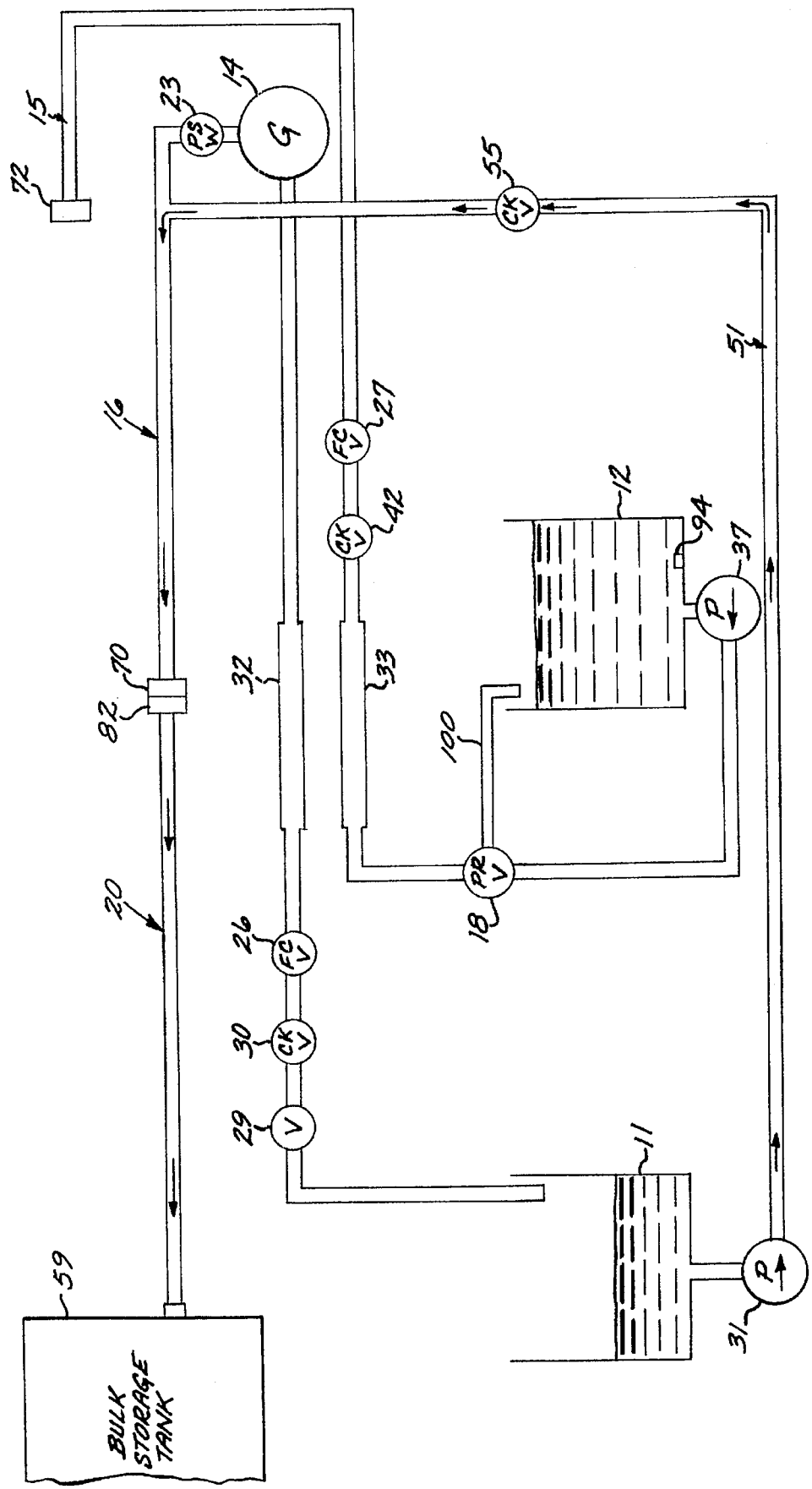
FIG. 7 is a schematic diagram similar to FIG. 2 of a second embodiment of the transmission fluid changer apparatus of the present invention.

The drain tank 11 has connected thereto adjacent the bottom end thereof one end of a disposal tube leading to a disposable apparatus, generally designated 51, which tees at its opposite end to the drain hose 150 (FIGS. 2 and 7). The disposal apparatus has connected in line therewith a drain pump 31 and a check valve 55, the check valve serving to permit one directional fluid flow through the disposal tube. The drain pump comprises a quad valve 45 psi 12-volt pump in the preferred embodiment and is driven by a motor having a control circuit connected with a pole of the selector switch 28 such that the drain pump is actuated by placing the selector switch in the corresponding position as described in more detail below. It will be appreciated that, in practice the drain plumbing may, if desirable, be in the form of a conduit leading from the valve 29 and adaptable to lead directly to a stationary bulk storage tank 59 (FIG. 7).

In addition to the flow control valve 27, the supply plumbing 15 has connected in line therewith the 12-volt supply pump 37, a pressure relief valve 18, a supply sight glass 33, and a second one way check valve 42 (FIGS. 2 and 7).

The supply sight glass 33 is externally mounted on the control panel 22 of the cabinet 13 adjacent the drain sight glass 32. As such the operator may make a close comparison of the color of the fluids in, respectively, the drain and supply tubes to determine when the fluid exchange process has been completed. The actual process may consume more fluid than the capacity of the particular transmission, as the unused transmission fluid initially injected into the transmission will mix with and be contaminated by used fluid still contained in the transmission pan. However, this process will not only remove substantially all of the used fluid from the transmission, but the flow of unused fluid through the transmission will also serve to collect undesirable foreign matter that has built up within the transmission, thereby performing a flush of the transmission in addition to replacing substantially all of the used fluid in the transmission.

The second one way check valve 42 (FIGS. 2 and 7) prevents fluid from flowing through the supply plumbing toward the supply tank 12, thereby restricting fluid in the supply plumbing flowing from the supply tank to the transmission 18 of the automobile only.

The pressure relief valve 18 (FIGS. 2 and 7) acts as a bypass valve to maintain the pressure in the supply tube below a desirable level. If the pressure in the supply tube approaches an excessive level the pressure relief valve actuates and directs excess fluid through an excess fluid conduit 100 which conducts such fluid back to the supply tank 12. As such the pressure in the supply tube will be maintained at a desirable level and the internal components in the transmission will not be subjected to excessive fluid pressure levels.

Referring to FIG. 1, the cabinet 13 is of a generally rectangular shape, about 4 feet tall, 5 feet long and 2 feet deep. The control panel 22 is formed by a 45° panel joined between the top of the front wall and the front of the top wall. The various control knobs 90 and 92 for the control valves, sight glasses 32 and 33, selector switch 28, indicator lights 56, 67 and 69, as well as the pressure gauge 14 are all mounted on such control panel for convenient viewing and convenient access by the operator. Conveniently, tool shelves 95 are formed in one end wall and horizontal hand rails 97 and 99 are mounted high on the end and front walls for convenient grasping to push the cabinet about on its large cast iron wheels 101. In practice, suspension forks are mounted to the front of the cabinet for nesting therein of the couplings 70 and 72 at the free ends of the hoses 150 and 152 to hang such couplings opening upwardly to minimize drips of fluid therefrom.

The top wall of the cabinet 13 is formed with a plurality of respective recessed elongated longitudinal and transverse channels 36, 37 and 38 to define holding troughs for receipt of tools and the like (FIGS. 1 and 4). Also formed in the top wall are a pair of enlarged generally square door openings 60 within which are suspended the respective drain and supply tanks 11 and 12 for convenient access to the open tops thereof. The openings are normally covered by respective hinged supply and drain tank lids 34 and 35.

Referring to FIG. 5, the cabinet 13 includes an internal compartment 58 which has mounted therein the pumps 31 and 37 and which has suspended from the top wall thereof the drain and supply tanks 11 and 12. In practice, a 45 psi diaphragm pump such as that available under Model No. 2100-122 from FloJet of Irvine, Calif. has been found ideally suited for serving as the drain pump. Likewise, Model No. 4100-113 from FloJet is ideal as the supply pump. The respective pumps are fixedly mounted in spaced relation to the bottom wall of the cabinet. Formed on one side wall thereof is the tool shelf 95 for the storage of adaptor hose set 20 and the like.

The electrical control circuitry for the various electrical components is adapted to be powered by a 12-volt power source. A pair of 25 foot heavy duty jumper cables 39 and 41 are connected in circuit with the electrical components and carry at their distal ends respective clamps 43 and 45 for clamping to the terminals of a twelve volt battery. Such cables are conveniently adapted to be coiled and hung from a hanger 111 mounted on the front wall of the cabinet 13. The jumper cables may be connected to the vehicle's battery to thereby supply power to the electrical components. As such, the portability of the unit is enhanced, being independent of electrical outlets or other power interconnections which may not be readily available in the particular environment in which the transmission flushing apparatus is to be utilized.

The pressure switch 23 has a first terminal electrically connected in common with a first terminal of the supply pump 37 and with a first terminal of the solenoid valve 29. The pressure switch has a second terminal connected to one pole of the selector switch 28, such pole corresponding with the "FLUSH TRANSMISSION" position of the selector switch. Thus when the pressure sensing switch detects a predetermined fluid pressure in the drain tube 16 and the selector switch is turned to the "FLUSH TRANSMISSION" position, the switches act in concert to electrically activate the supply pump to flow pressurized transmission fluid from the supply tank 12 through the supply tube and into the transmission of the automobile and activate the solenoid valve to open the used fluid path through the drain tube.

Referring to FIG. 2, the automatic transmission flushing apparatus of the present invention further includes a fluid level sensor 94 connected in circuit with the on-off solenoid valve 29 and mounted in the bottom of supply tank 12 adjacent the bottom thereof to monitor the fluid level therein (FIGS. 2 and 7). Should the fluid level in the supply tank drop below a selected level during the exchange process the capacitance in the sensor will change thus altering the rate of current flow therethrough. The resultant change in current will act as a signal communicated to the on-off solenoid valve to cause that valve to close. By thus blocking withdrawal of used fluid from the transmission a full level of fluid is assured within the transmission. A warning light 56 mounted on the control panel is connected in circuit with the sensor to be energized when a low fluid level is detected and remains illuminated until the operator replenishes the supply of unused fluid within the supply tank. When the operator has filled the supply tank above the level of the sensor, the warning light will deactivate and the electric valve will reopen so that the fluid exchange process may continue.

In operation, when it is desirable to change the fluid in a transmission 18, the free ends of the drain and the supply hoses 150 and 152 are connected for fluid communication with, respectively, the cooler line 21 and to the port 19 by means of the appropriate adaptor tubes from the set 20 which releasably connect to the respective coupler fittings 74 and 76 of the cooler line and port (FIG. 2). It will be appreciated that these connections may be at any desirable locations in the system such as external fluid filters, or radiator cooling lines. In practice for passenger cars, it has been found convenient to access such radiator lines by inserting quick disconnect fittings which will remain in those lines for convenient use in subsequent fluid change operations.

In any event, after the connections have been made through the couplers, the free ends of electrical cables 39 and 41 are clamped to the terminals of the automobile battery, by the respective clamps 43 and 45, and the automobile engine started, resulting in the activation of the automobile's automatic transmission pump 40 which pumps used transmission fluid into the cooler line. Fluid flow is initially blocked through the drain tube into the drain tank 11, however, by the on-off solenoid valve 29. The supply pump 37 likewise remains off during this initial stage as the pressure switch 23 has not yet electrically activated the pump. As such, no unused fluid will initially flow through the supply plumbing and into the transmission. The fluid pressure in the drain plumbing 16 may be determined by the operator from the pressure gauge 14 for comparison with the manufacturer's specified pressure to give an indication as to whether the transmission pump 40 may be defective. When the pressure attains a selected level the pressure switch is actuated and the operator may then switch the selector switch 28 to the "FLUSH TRANSMISSION" position. The pressure switch and selector switch then act in concert to direct 12-volt DC power to the solenoid valve 29 and the supply pump 37 to thereby simultaneously activate the pump and valve to open the solenoid valve and thus the used fluid path through the drain tube while simultaneously opening the unused fluid flow path through the supply tube to introduce pressurized new fluid into the transmission at a rate dictated by the capacity of such pump. Used transmission fluid will be pumped through the drain tube and into the drain tank at the rate dictated by the pressure generated by the transmission pump 40. Concurrently, unused transmission fluid is simultaneously pumped through the supply tube and into the radiator 17 via the port 19. The flow rate through the drain tube may be determined by observing the rate at which fluid accumulates in the drain tank 11 while the flow rate through the supply tube may be determined by observing the rate at which unused fluid is withdrawn from the supply tank 12. The unused fluid flow control valve 27 may be manually adjusted by means of the flow control knob 90 mounted on the control panel 22 to maintain the fluid flow rate of unused fluid into the transmission through the supply tube equal to the rate at which used fluid is flowing through the drain tube and accumulating in the drain tank. In this manner, used transmission fluid is pumped from the transmission simultaneously and at substantially the same rate as unused transmission fluid is injected into the transmission through the supply tube. If the pump established flow rate for the unused fluid is set at such a high rate as to cause the pressure in the supply plumbing to build up to the pressure at which the relief valve 18 is set, such valve will operate to relieve the excess flow back to the supply tank 12 through the excess fluid conduit 100, thereby protecting the transmission from damage. In addition, if the used fluid flow rate cannot be matched by the unused fluid flow rate the used fluid flow control valve 26 may be manually adjusted by means of the flow control knob 92 to decrease the fluid flow rate of used fluid through the drain tube to thereby match the unused fluid flow rate.

The operator may determine when the volume of fluid removed from the automatic transmission is equal to manufacturer's specification for the volume of fluid specified by observing the level of removed fluid collected in the drain tank 11. Then the operator can continue to compare the color of the fluids flowing through the respective sight glasses 32 and 33, until the fluid in the used sight glass 32 approaches that of the fluid in the glass 33. The selector switch 28 may then be turned to the OFF position thereby ceasing the fluid exchange process. The free ends of the drain and supply hoses 150 and 152 may then be disconnected from the cooler line 21 and the port 19, respectively.

When the drain tank 11 is filled with used fluid and it becomes desirable to drain such used fluid, the free end of drain hose 150 may be inserted in a bulk waste storage tank 59 (FIG. 7) and the selector switch 28 switched to the "DRAIN USED FLUID" position thereby conducting 12-volt power to the pole of the selector switch to which the drain pump 31 is electrically connected so that power is supplied to the drain pump. That pole of the selector switch is connected in common with the drain pump and an indicator lamp 67 so that the lamp will also be actuated when the selector switch is turned to the "DRAIN USED FLUID" position (FIG. 4). As such, the indicator lamp signals that the pump is operative to drain the used fluid from the drain tank 11 through he disposal tube 51 and in the waste storage tank (not shown).

Figure 6:
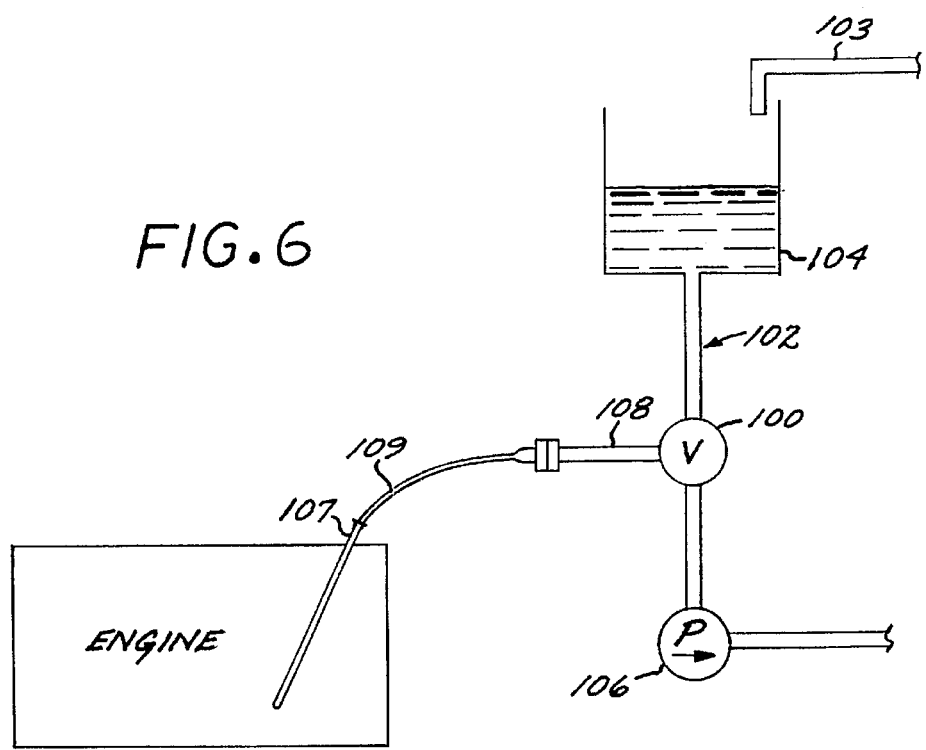
FIG. 6 is a partial schematic diagram of components included in a second embodiment of the transmission fluid changer apparatus shown in FIG. 1.

The embodiment of the present invention shown in FIG. 6 is similar to that shown in FIGS. 1–5 and includes a three way adjustable valve 100 in line with a disposal tube, generally designated 102, leading from a drain tank 104 to a drain pump 106. A withdrawal pipe, generally designated 108, is fixedly connected on one end to the side port of the three way valve and has connected to its free end a flexible hose defining a nozzle 109 configured for inserting into an engine oil filler tube 107. The withdrawal hose is configured so that, if desired, it may be inserted in power steering filler port, a transmission filler port, an air conditioning filler port or the like. It will be appreciated this withdrawal means may be used with various systems that have accessible filler ports. In normal operation the three way valve is configured to flow fluid from the drain tank to the drain pump. The operator may adjust the three way valve by rotating a valve handle (not shown) to block fluid flow from the drain tank and allow direct fluid from the withdrawal hose 109 to the drain pump 106. Fluid may then be drawn from a transmission without accessing through the cooler lines the withdrawal hose may be inserted into the fluid filler port 107 and the selector switch set to "DRAIN USED FLUID" (FIG. 4). This serves to actuate the drain pump, such activation serving to pump such fluid through the withdrawal hose 109. The free end of the drain hose (not shown) may be connected to a suitable bulk waste storage tank, as will be described above with respect to the system shown in FIG. 7.

Figure 8:
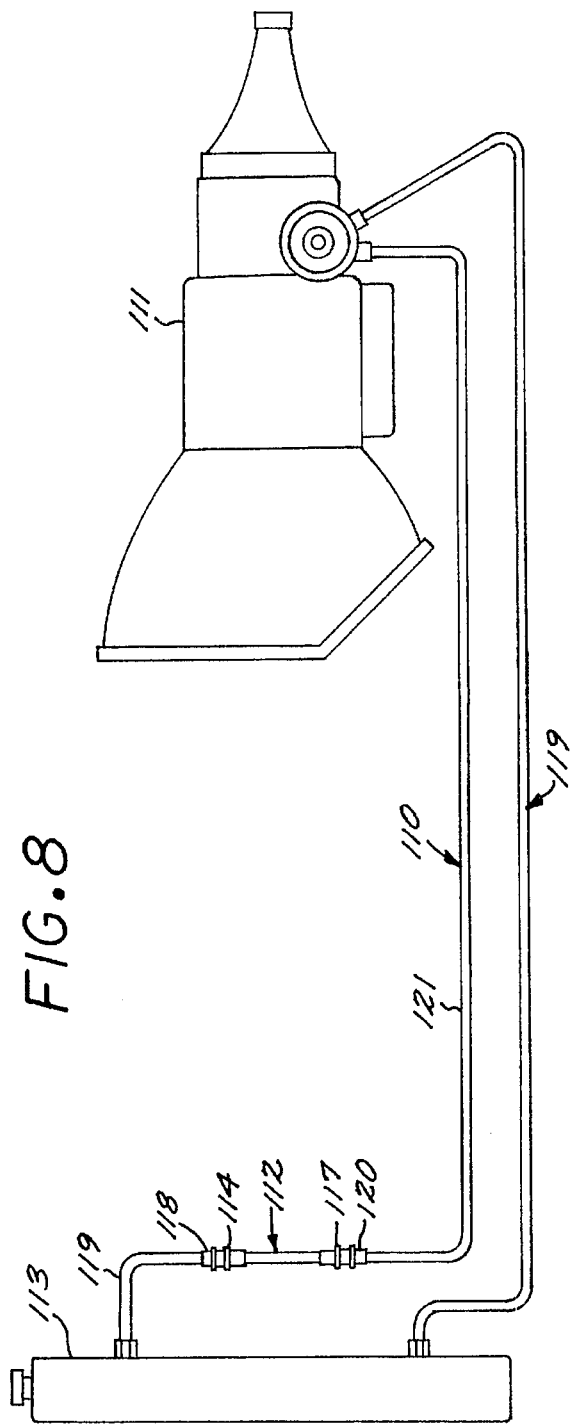
FIG. 8 is a side view of a third embodiment of the transmission fluid changer apparatus of the present invention.
Figure 10:
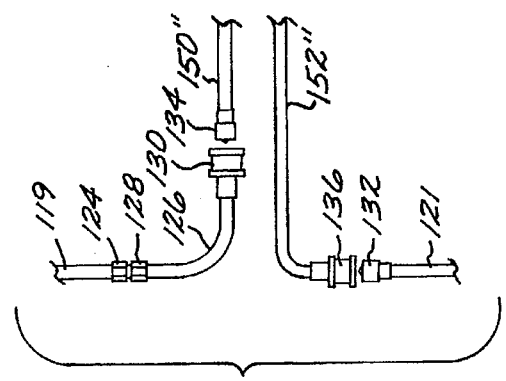
FIG. 10 is a fragmentary side view similar to FIG. 9 but showing a differently configured quick disconnect coupling disconnected from the cooler line.

Referring to the embodiment shown in FIG. 8, there is shown one example of a quick disconnect coupling arrangement in the cooler lines to facilitate repeated, efficient access to the radiator cooler lines for repeated fluid flushing at the end of various service periods. A segment of a cooler line, generally designated 110, conducting used fluid from the transmission 111 to the radiator 113 is shown cut away to leave a radiator segment 119 spaced from a transmission segment 121. A quick disconnect coupling, generally designated 112, is interconnected between the respective exposed ends of the segments 119 and 121. The coupling includes a pair of female quick couplers 114 and 117 at the respective opposite ends thereof for connection to respective male couplers 118 and 120 attached to the respective exposed ends of the segments 119 and 121. Installation of the quick disconnect can take place the first time the transmission fluid is changed and thereafter, the disconnect and reconnect can be made rapidly.

Figure 9:
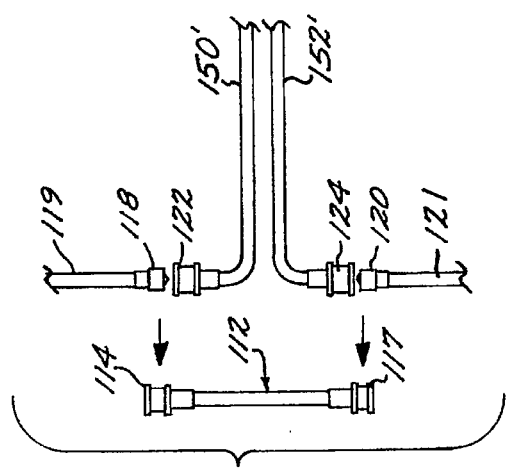
FIG. 9 is a fragmentary side view similar to FIG. 8 but showing a quick disconnect coupling disconnected from the cooler line to allow access thereto by the drain and supply tubes.

In use, the operator may quickly disconnect the respective female couplers of the quick disconnect coupling 112 from the male couplers 118 and 120 and supply releasably connect quick couplers 122 and 124 of respective drain and hoses 150' and 152' from an automatic transmission flushing apparatus described hereinabove, (FIG. 9). The operator may then start the vehicle's engine and actuate the transmission flushing apparatus as described above such that the transmission fluid exchange may be performed.

It will be appreciated that the quick disconnect coupling may have a different configuration than the one described above. For example, the coupling may comprise a flexible hose coupler 126 mounting on one end a nipple fitting 128 to connect to a female fitting 129 secured to the downstream exposed end of the segment 119. Mounted at the opposite end of the coupling hose 126 is a female quick disconnect 130 to couple with a male coupling 134 of a drain hose 150" leading from the fluid changer of the present invention. The supply hose 152" may then be coupled to the transmission segment 121 of the cooler line by mating the quick disconnects 136 and 132. The quick disconnect coupling 130 may then be connected to the male coupling 134 of the drain hose 150". The female coupling at the end of the supply hose may then be coupled to the coupling 132 on the cooling line segment 121 to then complete a fluid circuit through the fluid changer and transmission. The fluid exchange process may then be performed as discussed above.

It will be appreciated that, in normal operation the coupler 126 is coupled between the cooler line segments 119 and 121. When it is desirable to service the transmission, the technician may uncouple the disconnect coupling 130 from the coupling 132 to gain access to the cooler line. From the foregoing, it will be appreciated that the transmission fluid changer and filling apparatus of the present invention provides an efficient and practical means for performing a complete exchange of new fluid for used fluid in an automatic transmission. The process occurs simultaneously, and is without risk of damage to the transmission of the vehicle. Additionally, it may be employed to extract fluid from an automatic transmission, power steering circuit, air conditioner or the like from the fill opening thereof.

While several forms of the invention have been illustrated and described, it will also be apparent that various modifications can be made without departing from the spirit and scope of the invention. Accordingly, it is not intended that the invention be limited, except as by the appended claims.

What is claimed is:

1. A transmission fluid changer apparatus for tapping into a downstream transmission component downstream of an automatic transmission pump operative to pump transmission fluid at a predetermined rate and into an upstream component upstream of said transmission pump for removing used fluid from said transmission to a drain tank while pumping clean fluid from a supply tank to said transmission, said apparatus comprising:

a housing;

a fluid circuit mounted in said housing, including a drain tube for connection on one end to said drain tank and including on its opposite end a drain coupler for connection to said downstream transmission component for receiving transmission fluid at said predetermined rate and a supply tube for connection on one end to said supply tank and including on its opposite end a supply coupler for connection to said upstream component;

a supply pump device connected to said supply tube for pumping clean transmission fluid through said supply tube; and a flow control device in said supply tube for controlling the rate of fluid flow through said supply tube whereby said drain coupler may be coupled with said downstream component and said supply coupler coupled with said upstream component, said transmission pump operated to pump used transmission fluid at said predetermined rate and said flow control device adjusted to control the flow rate of unused transmission fluid through said supply tube at a rate substantially equal to said predetermined rate.

2. The apparatus of claim 1 for servicing selected vehicles having predetermined different transmission and radiator connection ports and that includes:

a set of adapter hoses configured to connect with the respective connection ports of the respective said different transmissions and including respective end fittings sized and configured for mating with the respective said connection ports.

3. The apparatus of claim 1 further including:

a pair of sight glasses in the respective said supply and drain tubes to provide for visual observation of fluid flow through said tubes.

4. The apparatus of claim 1 for connection to a transmission cooler line severed to provide respective proximate ends spaced apart a predetermined distance and including cooler line unused and used fluid quick disconnect couplers connected to the respective said ends of said cooler line;

a coupler tube for receipt between the respective said ends of said cooler line and including on its opposite ends respective quick disconnect couplings for coupling with the respective said cooler line unused and used fluid quick disconnect couplers and wherein:

said drain and supply couplers are adapted for coupling with the respective said cooler line unused and used fluid quick disconnect couplers.

5. The apparatus of claim 1 for connection to a transmission line leading to said upstream and downstream components and severed to leave ends spaced apart a predetermined distance to define a gap and including:

respective unused fluid upstream and used fluid downstream couplers on the respective said ends, said unused fluid coupler defining said upstream component; and a flexible coupler hose for receipt in said gap and including on one end a coupler for coupling with said unused fluid upstream coupler and on its opposite end with a coupler for coupling with said used fluid downstream coupler.

6. The apparatus of claim 1 further including:

a pressure relief valve in said supply tube to actuate upon sensing a predetermined pressure in said supply tube, said pressure relief valve including a pressure relief port; and an excess flow tube connected at one end to the pressure relief port of said pressure relief valve and adapted on its opposite end for connection to said supply tank to direct excess fluid to said supply tank upon activation of said pressure relief valve.

7. The apparatus of claim 1 further including:

a flow control valve in said drain tube for controlling the flow rate of used fluid from said downstream component to said drain tank.

8. The apparatus of claim 1 wherein:

said pump includes a direct current drive motor and wherein said apparatus further includes:

electrical cables in circuit on end with said direct current motor and including battery terminal clamps on the opposite end.

9. The apparatus of claim 3 wherein:

said sight glasses are formed of hollow transparent tubing.

10. The apparatus of claim 1 further including:

a waste tube for connection at one end to said drain tank and including an opposite end connected to said drain tube; and a drain pump in said waste tube to flow used transmission fluid from said drain tube to said drain tank.

11. The apparatus of claim 1 further including:

a pressure sensing switch in said drain tube operative upon sensing a predetermined fluid pressure in said tube to generate an electrical signal; and an on-off solenoid valve in said drain tube and connected in electrical circuit with said pressure sensing switch and responsive to said electrical signal to open to flow fluid in said drain tube.

12. The apparatus of claim 10 further including:

a three way valve in said waste tube upstream of said drain pump; and a vacuum withdrawal hose connected at one end to said three way valve and including an opposite end configured for insert into a fluid filler port of an automobile system so that activation of said drain pump will serve to evacuate fluid through said port.

13. The apparatus of claim 1 further including:

a pair of one way check valves in the respective said drain and supply tubes to permit one directional flow through said tubes.

14. The apparatus of claim 1 further including:

a plurality of wheels supporting said housing for increased portability of said transmission fluid changer apparatus.

15. The apparatus of claim 13 wherein:

said housing is in the form of a portable cabinet and includes a top wall formed with a plurality of recessed elongated, upwardly opening holding troughs.

16. The apparatus of claim 1 wherein:

said supply pump includes an electrical motor.

17. The apparatus of claim 1 further including:

a quick disconnect coupling releasably connected to said downstream transmission component and including on its opposite end a quick disconnect coupling for releasably coupling to said upstream transmission component to normally flow fluid from said downstream component to said upstream component.

18. The apparatus of claim 1 wherein:

said housing is in the form of a cabinet, including an interior compartment; and said tanks are mounted in said interior compartment.

19. A transmission fluid changer system as set forth in claim 1 wherein:

said flow control device includes a pressure responsive valve in fluid communication with said supply tube to sense pressure in said supply tube and responsive to the sensed pressure to control the rate of fluid flow through said supply tube.

20. A transmission fluid changer system as set forth in claim 1 that includes:

a pressure responsive valve in fluid circuit with said supply tube and responsive to the fluid pressure created by said supply pump to control the flow rate through said supply tube.

21. A transmission fluid changer system for tapping into a downstream component of an automatic transmission operative to pump transmission fluid and also tapping into an upstream transmission component for removing used transmission fluid from said downstream component to a drain tank while supplying pressurized fluid from a supply tank to said upstream component, said system comprising:

a housing;

a fluid control circuit mounted in said housing, including a drain tube for connection on one end to said drain tank and formed on its opposite end with a downstream drain end, and a supply tube for connection on one end with said supply tank and formed on its opposite end with an upstream supply end;

a drain hose connected at one end to said drain end of said drain tube and including on its opposite end a connector for connection with said downstream component;

a supply hose connected at one end to said supply end of said supply tube and including on its opposite end a connector for connecting to said upstream component;

a return line in fluid communication on one end with said supply tube and having an opposite end for connection with said supply tank; and a flow control apparatus including a pressure responsive valve device for directing flow between said supply tube and said return line to maintain a predetermined pressure in said supply tube.

22. A transmission fluid changer system as set forth in claim 21 wherein:

said flow control apparatus includes means responsive to the pressure in said supply tube to direct a portion of the flow from said supply tube to said return line.

23. A transmission fluid changer system for tapping into a downstream component of an automatic transmission operative to pump transmission fluid at a predetermined rate and also into an upstream transmission component for removing used transmission fluid from said downstream component to a drain tank while supplying pressurized fluid from a supply tank to said upstream component, said system comprising:

a housing;

a fluid control circuit mounted in said housing, including a drain tube for connection on one end to said drain tank and formed on its opposite end with a downstream drain end, said fluid control circuit further including a supply tube for connection on one end with said supply tank and formed on its opposite end with an upstream supply end;

a drain hose connected at one end to said drain end of said drain tube and including on its opposite end a connector for connection with said downstream component;

a drain control valve for controlling flow through said drain tube;

a supply hose connected at one end to said supply end of said supply tube and including on its opposite end a connector for connecting to said upstream component; and a flow control valve on said housing for controlling the rate of flow through said supply tube at a rate substantially equal to said predetermined rate.

24. A method of introducing clean transmission fluid from a supply tank under pressure to an upstream transmission component upstream of an automatic transmission pump while removing fluid from a downstream transmission component downstream of the pump, including the following steps:

selecting a transmission fluid changer apparatus of the type having a housing encasing respective supply and drain tubes having respective inlet ends and outlet ends, respective supply and drain hoses connected with said supply outlet end and said drain inlet end, respectively, and including on the free ends of the respective supply and drain hoses connectors for connecting with the respective said upstream and downstream transmission components and a first flow control valve for controlling flow in said supply tube;

uncoupling said upstream and downstream transmission components to leave a respective transmission fluid inlet and outlet accessible for respectively adding clean and removing used transmission fluid;

connecting the respective said supply and drain connectors with the respective said transmission fluid inlet and outlet;

operating said transmission pump to flow transmission fluid at a predetermined rate from said transmission through said drain hose to said drain tank, while simultaneously flowing pressurized clean transmission fluid through said supply hose to said upstream component; and adjusting said first flow control valve to establish a flow rate through said supply hose substantially equal to said predetermined flow rate to thereby flow fluid into said transmission at substantially the same rate said transmission pumps used fluid from said transmission.

25. The method of claim 24 further comprising the steps of:

selecting a second flow control valve in said drain tube for controlling the rate of flow through said drain tube; and adjusting said second flow control valve to control the rate of flow of used fluid through said drain tube.

26. The method of claim 24 further comprising the step of:

selecting said supply and drain connectors in the form of quick disconnect couplers.

27. The method of claim 24 further comprising the step of:

selecting said first flow control valve in the form of a manually actuated valve.

\* \* \* \* \*